United States Patent
den Hartog et al.

(10) Patent No.: US 11,416,587 B1
(45) Date of Patent: Aug. 16, 2022

(54) SECURITY DEPLOYMENT AND MANAGEMENT MECHANISM FOR SOFTWARE CONTAINER

(71) Applicant: Amazon Technologies, Inc., Seattle, WA (US)

(72) Inventors: Peter den Hartog, Poortugaal (NL); Marios Zintilis, Dublin (IE); Dexter W. Markley, Oakhurst, CA (US)

(73) Assignee: Amazon Technologies, Inc., Seattle, WA (US)

( * ) Notice: Subject to any disclaimer, the term of this patent is extended or adjusted under 35 U.S.C. 154(b) by 523 days.

(21) Appl. No.: 16/365,488

(22) Filed: Mar. 26, 2019

(51) Int. Cl.
   *G06F 21/31* (2013.01)
   *G06F 8/61* (2018.01)
   *H04L 29/06* (2006.01)
   *H04L 43/00* (2022.01)
   *H04L 9/40* (2022.01)
   *H04L 43/04* (2022.01)

(52) U.S. Cl.
   CPC .......... *G06F 21/31* (2013.01); *G06F 8/61* (2013.01); *H04L 43/00* (2013.01); *H04L 63/1408* (2013.01); *H04L 43/04* (2013.01)

(58) Field of Classification Search
   CPC . G06F 21/31; G06F 8/61; H04L 43/00; H04L 43/04; H04L 63/1408
   See application file for complete search history.

(56) References Cited

U.S. PATENT DOCUMENTS

| | | | | |
|---|---|---|---|---|
| 7,213,047 | B2 * | 5/2007 | Yeager | H04L 67/104 709/202 |
| 8,239,917 | B2 * | 8/2012 | Hammond, II | H04L 63/20 726/1 |
| 8,346,897 | B2 * | 1/2013 | Jaroker | G06F 16/9535 709/220 |
| 8,689,282 | B1 * | 4/2014 | Oprea | H04L 63/20 726/1 |
| 8,732,182 | B2 * | 5/2014 | Bethlehem | H04L 63/104 707/758 |
| 8,763,127 | B2 * | 6/2014 | Yao | G06F 21/566 726/24 |
| 9,088,606 | B2 * | 7/2015 | Ranum | H04L 67/02 |
| 9,609,018 | B2 * | 3/2017 | Smith | H04L 63/0227 |

* cited by examiner

*Primary Examiner* — Hosuk Song
(74) *Attorney, Agent, or Firm* — Davis Wright Tremaine LLP

(57) ABSTRACT

A data security server or system may be installed or placed into network to perform data security and network monitoring and analysis functions. The data security server may operate an isolated computing instance or engine, such as a software container engine. A computing resource service provider may send commands to the data security server to provision a variety of data security and monitoring applications in isolated software containers of the data security server. The data security server, via the data security and monitoring applications, may obtain copies of traffic going into and out of the network, and analyze the traffic to produce security data. The security data may be uploaded to the service provider for storage and retrieval.

20 Claims, 8 Drawing Sheets

SECURITY DEPLOYMENT AND MANAGEMENT MECHANISM FOR SOFTWARE CONTAINER

BACKGROUND

As the use of remote computing increases, it is becoming more and more challenging to effectively manage information security. Systems are becoming more and more complex, often with multiple different subsystems (e.g., services) managed by different entities (e.g., different administrators in different business units). Clients may wish to access various resources through a variety of different networks, both trusted and untrusted. While data security solutions are adapting to different computing environments, visibility into network traffic, particularly for untrusted or remote networks, still poses many challenges for current data security solutions. These data security solutions are rapidly changing, making it increasingly more difficult to build solutions that can adapt to this changing environment.

BRIEF DESCRIPTION OF THE DRAWINGS

Various techniques will be described with reference to the drawings, in which.

DETAILED DESCRIPTION

Figure 1:
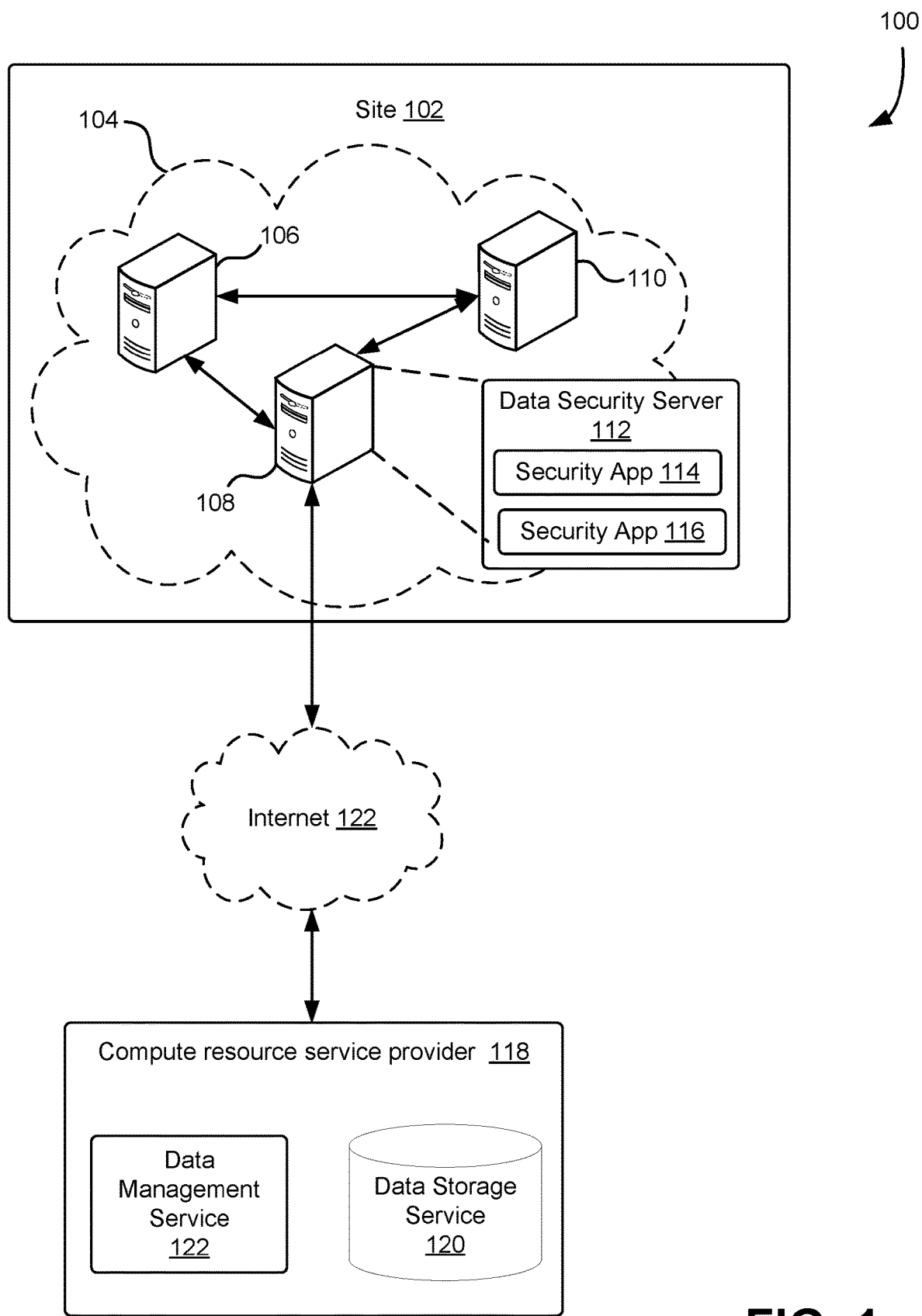
FIG. 1 shows an illustrative example of a data security server associated with a site of network in communication with a computing resource service provider, in which various embodiments may be practiced.

The current document describes systems and techniques for a secure information security architecture or system that is easily deployed into any network (trusted or untrusted) and readily controlled via a compute resource service provider or other trusted service. The information security architecture may be instantiated on a device in a network that has access to, or is connected with a device that has access to, traffic flow of the network, to create a data security server. The data security server may be created on stand-alone hardware, or integrated with existing network hardware, through the use of a virtualized environment, such as a software container engine or service, such as Docker. The data security server may be loaded with a software container engine, such that it can support multiple different software containers that may share a host operating system, libraries, etc., but allow isolated execution of one or more applications in the separate software containers. Various security and monitoring applications may be installed in separate containers on the data security server, such as threat detection and network analysis tools. The security data server may also include a control agent, which enables a remote device, such as a data management service, to control operations performed by the one or more security and monitoring applications, and enables efficient updating and version control for those applications and the operations system of the data security server. The one or more security and monitoring applications may obtain copies of traffic (e.g., packets) of the network and perform various processes on that data to generate security data. The data security server may then send the security data to the data management or data storage service, where the data may be stored in a specified account, managed, and made accessible with proper credentials through a centralized interface.

In some cases, multiple data security servers may be created for a given network, and organized into a logical site. Each data security server may, in some cases, be on separate hardware, or may be virtualized on the same hardware. Each data security server may be isolated from other data security servers and other network computing resources, and may execute the same or different security and monitoring applications, such that each data security server is individually configurable. Each data security server may individually report security data back to a data management service, which can store the data in an account associated with the specific data security server.

In some cases, the data security server may be virtualized and run on commodity hardware, thus expanding the application of the described system and drastically reducing the time necessary to get a data security server up and running. Various security applications may be loaded onto the data security server, including various threat detection applications, network analysis applications, and others that may provide customizable deep packet inspection and various signature matching functionality.

In some cases, the framework of the data security server may be utilized to execute a variety of other applications in any network, such as for remote computing, remote networks, etc.

In one example, a data security server or instance is created by loading a supported operating system (e.g., Linux) and a software container engine onto a computing device connected to a network to be analyzed. The data security server may be logically associated with a site. A security code may be sent, from a data management service, via a separate communication channel, such as via email, to an administrator device used to create the site. The administrator may enter the security code into an interface provided by the site, which may communicate the security code to the data management service. Upon validating the security code, the data management service may send a number of commands to the site to install one or more security monitoring applications, such as threat detection and network analysis applications. In addition, the data management service may send a number of commands to the site to install a control agent, which gives the data management service access to control operations performed within the site, update the applications, etc., and a data storage service upload application, to facilitate reporting the security data back to a data storage service. Upon executing the commands, the site may obtain copies of traffic (e.g., packets) from the network, for example via a communication port of an internet gateway of the network (e.g. Ethernet port). The site, via the one or more security applications, may analyze the obtained traffic and generate security data indicating various attributes of the traffic. The site may upload the security data to a data storage service, to be made accessible to an administrator of the site. In some cases, the data management service may host the data storage service. In other examples the two services may be separate. In some aspects, by connecting directly to the internet gateway or other similar computing device of a network, and not an endpoint, such as one or more user devices (smart phones, tablets, etc.), data security concerns of obtaining copies of network traffic and generated analyzes of that data may be greatly reduced.

In some cases, the site may be divided into multiple separate software container engines or isolated computing resources or environments, to enable isolated analysis of traffic of different parts of a network. In these cases, multiple data security servers may be instantiated, on the same or different physical or virtual machines of the network, and each may be separately configurable to install and execute different security monitoring applications, and generate different sets of security data.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

As one skilled in the art will appreciate in light of this disclosure, certain embodiments may be capable of achieving certain advantages, including some or all of the following. The described system and techniques may provide enhanced data security for a variety of networks, including untrusted networks. The described system and techniques may also provide for a faster roll out of information security systems while maintaining the security of data, thus decreasing downtime, reducing security risk, particularly in untrusted or remote networks.

FIG. 1 shows an illustrative example 100 of a data security server 112 associated with a site 102 in communication with a computing resource service provider 118 via a communication network, such the internet 122. As illustrated, the site 102, may be associated with a network 104 that may include various computing devices or servers 106, 108, and 110. The data security server 112 may be a dedicated computing device, or may be a virtualized computing resource, such as a virtual machine and/or a software container engine, that may host and execute a number of security applications 114, 116. The computing resource service provider 118 may include a data management service 122, and a data storage service 120.

The data security server 112 may execute a number of security monitoring applications to obtain and analyze copies of traffic flowing into and out of network 104, to provide information security and analytic functionality through a compute resource service provider 118. The data security server 112 may be connected to a communication port, such as a SPAN, Ethernet, or optical port, of a communication device 108, of the network 104, such as an internet gateway or similar functioning device or virtualized machine. In some aspects, the data security server 112 may include a virtualized computing resource, such as a virtualized instance or software container engine, loaded onto an existing network computing resource, such as device or server 108, as will be described in greater detail below in reference to FIG. 2. In these cases, the data security server 112 may be configured to run an operating system that supports software containers and software container engines, such as Linux. The data security server 112 may, alternatively be a standalone computing device, loaded onto specific hardware, that may be connected to computing device 108. Examples of computing devices on which the data security server 112 may reside include physical computing systems (e.g., servers, desktop computers, laptop computers, thin clients, etc.), and/or services (e.g., via application programming interface calls, web service calls, or other programmatic methods), databases (which may be implemented on one or more of the foregoing examples), and the like. The data security server 112 may obtain copies of traffic of network 104, analyze the traffic via the one or more applications 1145, 116, and transmit the analyzed data and/or results to a compute resource service provider 118 via a network, such as internet 122. In some cases, the data security server 112 may include a control agent that enables a compute resource service provider 118 to control operations performed by the data security server 112 and/or specific applications 114, and/or 116. In some cases, the control agent may also perform/enable efficient updating and version control of one or more of applications 114, 116 and the operating system of the data security server 112. The data security server 112 may be isolated from network devices 106, 108, 110 to ensure that the data obtained and results of analyzes performed on the data are secure from these and other devices in network 104.

In some cases, the data security server 112 may be configured to execute other applications, such as applications related or not related to data security, provided by compute resource service provider 118 and/or outside developers.

The site 102 may be a logical organization of one or more data security servers 112 associated with a network 104. In some aspects, the site 102 may be associated with one or more of computing devices 106, 108, 110 of network 104. In some cases, site 102 may be associated with an identifier in a record stored in the data security server 112, the computing resource service provider 118, the data management service 122, the data storage service 120, or another computing device or storage location, or a combination thereof. In some aspects, the identity and IP address and/or other characterizes of the data security server 112, and/or computing devices 106, 108, 110 may be associated with a site identifier in a table maintained in memory of at least one of the data security server 112, the computing resource service provider 118, the data management service 122, the data storage service 120, or another computing device. In some aspects, site 102 may correspond to a physical location, such as a building or campus of an organization associated with a network.

The network 104 and network 122 may each be a communication network, such as the Internet, an intranet or an Internet service provider (ISP) network. The network 104 may include any number of computing devices 106, 108, 110, capable of communicating with one another.

In some cases, the network 104 may be a subsidiary network, for example, of the computing resource service provider 118. In this example, the network 104 may be of a company or organization acquired by an organization that operates the computing resource service provider 118. The computing resource service provider 118 or a user or admin layer may configure the data security server 112 and site 102 to enable data security functionality in the new network 104. In this example, provisioning the data security server 112 may be much quicker (e.g., a matter of hours) than standard approaches, which can typically take up to weeks to bring online. The data security server 112 may enable operational improvements to be made to the network 104 more quickly, by providing a system to run various applications within the new network, perform analytics, etc.

The computer resource service provider 118 is a computer system, and in some aspects, a distributed computer system, that includes a set of servers that may provide a customer-facing application programming interface (API) that customers and/or other services can call to configure, launch, and manage a number of compute instances or containers, such as one or more data security servers 112, and supporting resources, such as data storage, and other resources. The servers of the computer resource service provider 118 can include software and/or hardware to configured computer systems, to perform operations as described herein. The computer resource service provider 118 may include and interact with the data management service 122 and the data storage service 120 to obtain compute instance and container images to enable the computer resource service provider 118 to launch computing resources, such as one or more data security servers 112. The computer resource service provider 118 may also interact with the data storage service 120 to store, manage, and retrieve security data generated by the data security server(s) 112. In some aspects, the compute resource service provider 118 may host or be associated with the data management service 122 and the data storage service 120. In other cases, one or more of these services may be separate, as described below in reference to FIGS. 2 and 3.

The data management service 122 is also a computer system, and in some aspects, a distributed computer system, that includes one or a set of servers that may provide a customer-facing application programming interface (API) that customers and/or other services can call to configure, launch, and manage a number of data security servers 112 supporting multiple applications 114, 116 and other resources. The servers of the data management service 118 can include software and/or hardware to configured computer systems, to perform operations as described herein. The data management service 118 may interact with the data storage service 120 to store, manage, and retrieve security data generated by the data security server 112.

The data storage service 120 may include memory storage hardware and/or software to manage storing various security data generated by one or more data security servers 112, associated with one or more sites 102. The data storage service 120 may include one or more data storage volumes such as, for example, a magnetic disk drive (e.g., a spinning disk drive or a solid state disk drive), computer system memory, magnetic tape, or some other optical storage device. In another embodiment, the data storage service 120 may include virtual and/or shared data storage volumes that are mapped to physical storage volumes such as, for example, a disk drive, a solid state disk drive, computer system memory, magnetic tape, or some other optical storage device. As may be contemplated, the types of data storage volumes used by the data storage service 120 described herein are illustrative examples and other types of data storage volumes used by data storage service may be considered as within the scope of the present disclosure.

In some aspects, the compute resource service provider 118 may provide an account creation and data access interface to a client device or admin layer, to enable configuration of data security server(s) 112, data security applications 114, 116, other applications installable into data security server(s) 112, and to store, manage, and access data retrieved from data security server(s) 112 and stored by the data storage service 120.

A client device or admin layer (not shown) may configure and instantiate a data security server 112 into a network 104, associate the data security server 112 with a site 102, and store and retrieve data, obtained from the data security server 112 and/or applications 114, 116 thereof, from data storage service 120, according to the communications and processes described in greater detail below, in reference to FIGS. 4, 5, 6, and 7. In some aspects, the client device may additionally select and configure a number of different security applications 114, 116 to be installed on data security server 112.

One or more of computing resource service prover 118, the data management service 122, and/or the data storage service 120 may include or be hosted on web server 806 and/or application server 808, as described below in more detail in reference to FIG. 8. In some examples, data storage service may be an example of or include one or more aspects of data store 810 described in more detail in reference to FIG. 8.

Figure 2:
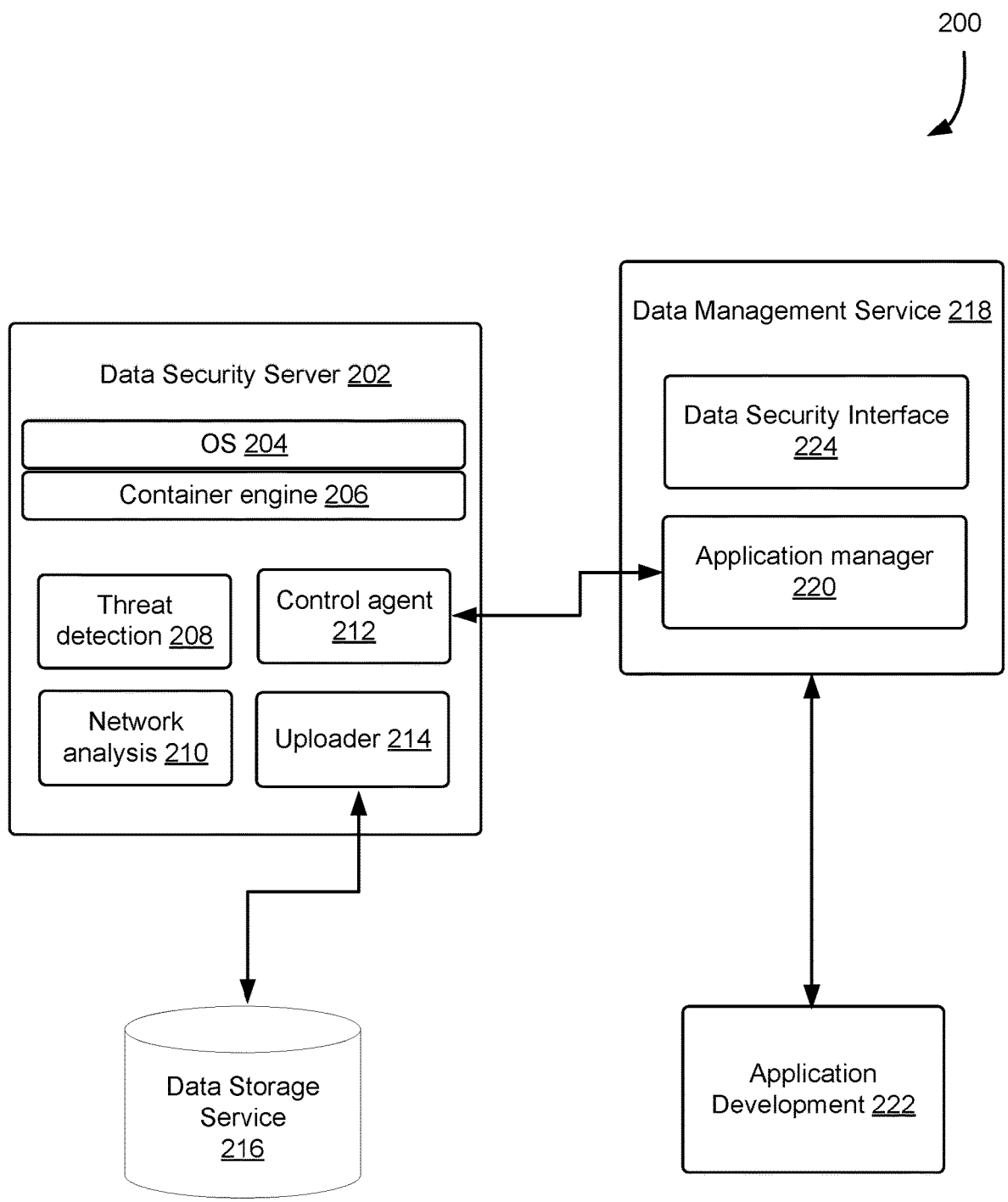
FIG. 2 shows an illustrative example of a data security server in communication with a data management service, in which various embodiments may be practiced.

FIG. 2 shows an illustrative example 200 of a data security server 202 in communication with a data management service 218 and a data storage service 216. The data management service 218 and the data storage service 216 may incorporate one or more aspects described above in reference to data management service 118 and data storage service 120, and will not be described again here.

The data security server 202 may include one or more aspects of data security server 112 described above in reference to FIG. 2. In the example illustrated, the data security server 202 may include an OS 204, such as Linux, that supports a software container engine 206, such as the Docker Engine or Docker Enterprise Container platform, offered by Docker, Inc., utilizing Container 1.2, or variants thereof, or similar services or products provided by other companies. The software container engine 206 may provide for isolated containers in which one or more of various applications 208, 210, 212, 214 may execute. In some examples the data security server 202 may be a virtualized computing instance or container instance operating on hardware connected to a network to be analyzed. In other cases, data security server 202 may run on distinct hardware, installed into a network.

In one embodiment, various components of the data security server 202 execute in a software container engine 206 or a software container service. In the present disclosure, a "software container" (also referred to as a "container" for brevity) may be an isolated user space instance. One or more of threat detection application 208, network analysis application 210, control agent 212, and/or uploader 214 may be executed in one or more software containers (each in its own container or some combined into one container). That is, in some embodiments a software container is a lightweight, virtualized instance running under a computer system instance, such as container engine 206, which includes programs, data, and system libraries. Therefore, in some embodiments, a software container engine 206 may simply abstract an operating system kernel, in contrast to a virtual machine which abstracts an entire hardware device. Furthermore, in some embodiments, although software containers run in isolation from each other, the software containers may share the same binaries and library files as needed.

When a software container is run, the running program (i.e., the process) may be isolated from other processes running in the same computer system instance. Thus, multiple software containers may each run under an operating system 204 (e.g., using memory, CPU, and storage allocated by the operating system) of a container instance and execute in isolation from each other (e.g., each container may have an isolated view of the file system of the operating system). Each of the containers 208, 210, 212, 214 may have its own process namespace, and applications running within the containers may be isolated by only having access to resources available to the container process namespace.

The process namespace may be associated with process identifiers (PID) associated with running processes. Thus a PID namespace may provide isolation for the PID-allocated processes running in the namespace. Another type of namespace referred to in the present disclosure is a network namespace. In some embodiments, a network namespace isolates physical or virtual network interface controllers, firewall rules, routing tables, and so on. In some implementations, network namespaces may be communicatively coupled to each other using a virtual Ethernet device.

A system that manages software containers may be referred to in the present disclosure as a software container engine, such as engine 206. In the present disclosure, a software container service may be a software container engine that executes as a service. It is contemplated that a standalone software container engine (e.g., the Docker container engine, the CoreOS Rocket container engine, provided by CoreOS, etc.) can be configured to perform the techniques described in the present disclosure.

Software containers may be launched to have only specified resources from resources allocated to the container instance under which the software container is running; that is, a task definition may specify that a software container only utilize a specified amount of memory and/or a specified amount of processing power. In some examples, a "task definition" refers to parameters specifying a set of containers (i.e., a set of containers that, when running on a host computing system, are associated with each other) that are to start as a group, for example defined by the data management service 218. The task definition may be written in any suitable format, such as Python. In other examples, the task definition may be written in another format, such as JavaScript Object Notation (JSON), Extensible Markup Language (XML), etc. The task definition may further specify disk and network locations that the software containers are able to share on a single physical machine. Thus, the task definition may be utilized for launching the set of software containers. A task definition file may specify multiple tasks for respective software containers. In some examples, a "task" refers to a process specified in the task definition to be performed by a software container. In some aspects, a site, or logical grouping of software containers, may be at least partially defined by a task definition file.

As illustrated, the data security server 202 may include a threat detection application, engine, or process 208. The threat detection application 208 may obtain packets entering and exiting the network to be analyzed, for example via one or more connections with an internet gateway of the network, such as via an Ethernet port, SPAN port, or optical port. The threat detection application 208 may perform real time or near real time intrusion detection, inline intrusion prevention, and other network security monitoring functions, for example based on one or a number of rule sets. In some aspects, the threat detection application 208 may include a signature library that may detect certain threats based on known, anticipated, or configurable signatures found in network traffic. The threat detection applications 208 may support a variety of input and output formats, such as YAML and JSON, and in some aspects, may be open source. In some examples, the threat detection application may include some or all of the functionality of a Suricata engine.

As also illustrated, the data security server 202 may include a threat detection application 208. The network analysis application 210 may obtain packets entering and exiting the network to be analyzed, for example via one or more connections with an internet gateway of the network. The network analysis application 208 may perform deep packet inspection, generate logs of network activity, perform semantic analysis on packets, and so on. Examples of software than may be utilized by the network analysis application 210 include packet analyzers (e.g., Fiddler) or network monitoring framework (Bro Network Security Monitor, Zeek, or components thereof). Additionally, the network analysis application 210 may include or communicate with hardware components such as network monitoring interface cards (NMICs). The network analysis application 210, upon detecting communications (e.g., a packet or message) from a network server to an outside device or vice versa, may parse the communications and obtain network traffic information related to the communications and provide the network traffic information to a session queue to be recorded. Network traffic information may refer to structured data related to the communications, the sender IP and port, destination IP and port, message, and information indicating a temporal sequence that allows other components to determine the relative ordering of one communication of a session with another communication of a session. Network traffic information includes at least data from a communication that is usable to: define a temporal ordering of the communication relative to other communications in a session; and determine a session state. As an example, network traffic information may comprise a timestamp, sequence number, or other temporal value indicating when the network monitor processes a communication and a TLS handshake message type, where the timing may be a based on a clock measurement (e.g., a timestamp) or relative to other communications (e.g., a sequence number).

Each of threat detection application 208 and network analysis application 210 may generate results of analyses performed by the respective applications. The applications may send those results, herein collectively referred to as security data, to the data uploader 214 to be sent to data storage service 216. In some aspects one or more alerts or notifications may be generated, either by one or more processes of the data security server 202, the data management service 218, and/or the data storage service 216, to notify relevant parties of potential security risks or breaches. In some aspects, the data management service 218 may include a data security interface 224, which may provide any number of different and configurable interfaces, (e.g., web interfaces, graphical user interfaces, etc.) for system administrators to interact and received notifications from data security server 202.

In some aspects, data security server 202 may also include other containers executing other applications or processes not illustrated, including providing any of a number of other related security analysis and data security monitoring functionality. It should be appreciated that the various configurations of the applications 208, 210, and other applications may be organized into and/or share software containers based on resources available, security needs, and resources needed to perform certain analyses, and so on.

The data security server 202 also includes a control agent 212, which interfaces with data management service 218 and enables the data management service 218 to control operations performed by data security server and applications 208, 210, and 214. In some aspects, the control agent may be provisioned with the OS 204 and/or container engine 206, and/or activated via submission of a security code or other credentials to the data management service 218, as will be described in greater detail below in reference to FIGS. 4, 5, 6, and 7. In some aspects, the control agent 212 may update one or more applications 208, 210, 214, the OS 204, or other aspects of data security server 202, and/or may control other functions performed by components of the data security server 202. In some cases, the containerized environment of the data security server 202 may enable rolling out updates and layer solutions to the various sub-systems of data security server 202 and layer solutions. For example, a standard version of an application, such as applications 210, may be installed into a first container. One or more updates may be installed in a new container, and network specific plugins installed into another.

The data security server 202 also includes a data uploader 214. The data uploader 214 may obtain data generated by one or more of threat detection application 208 and network analysis application 210, and/or other applications not illustrated, and/or copies of packets obtained from the network, and transmit that data to a data storage service 216. The data storage service 216 may store the received data in an account record associated with the data security server 202. In some aspects, the data security server 202 may receive credentials, for example, from an admin or user device, to link an account of the data storage service 202 with the data security server 216. The data security server 202 may send the credentials to the data storage service 216, and upon validation, may send the security data to the data storage service 216 for storage and access associated with the account.

In some aspects, the data security server 202 may upload all or most obtained traffic data and generated security data to a data storage service 216, without persistently or permanently storing that data on the server 202 itself. In some cases, the obtained traffic data and generated security data may be stored in a temporary file system of the OS 204, and cleared or erased on powering down of the security server 202. Upon restarting the data security server 202, the control agent 212 will attempt to authenticate with the data management service 218. If authentication fails, the data security server 202 may be wiped clean via the control agent 212, such that the applications 208, 210, and 214 may be erased, thus protecting security of data and applications of the data security server 202.

In some aspects, the security of data obtained and analyzed by the data security server 202 may be increased by only maintaining images in read-only format (e.g., check summed), by limiting or restricting root access to the OS 204, and not allowing a secure shell (SSH) to be installed on the server. In some aspects, the only aspects or components of the data security server 202 that interface to a network may be the control agent 212, and the uploader 214, which may be run in containers, thus isolating from the rest of data security server 202.

In some examples, the data management service 218 may include an application manager 220, which may be a process executed by the data management service 218 to send updates to the one or more applications 208, 210, 212, or 214. In some aspects, the application manager 220 may receive application updates and/or new applications from an application development process or system 222. In some aspects the application development system 222 may be a computing device, a distributed computing system, and/or may include a network of various devices enabling multiple different actors to update and develop new applications for data security server 202. The application manager 220 may periodically, or upon receiving updates from application development 222, send the updated instructions or commend sets to the control agent 212. The control agent 212 may facilitate updating or installing new applications within the data security server 202.

In some aspects, the application manager 220 may also be responsible for provisioning a new data security server 202 in the first instance. In this case, the application manager 220 may facilitate a computing device to install or verify installation of a supported OS 204 and a software container engine 206, to transform a computing device into data security server 202. In some cases, the initial provisioning may include installing a control agent 212 into a container on the computing device. In other cases, the control agent 212 may be installed at a later time. The application manager 220 may also send a set of commands for the data security server 202 to install the threat detection application 208, the network analysis application 210, the uploader 214, and in some cases, the control agent 212.

In some cases, the OS 204 and container engine 206 may be installed on a computing device in network, such as an untrusted network, to perform other functions, outside of data security functions. In this case, the isolation of the different containers operating under the container engine 206 may enable placing any software into an untrusted network, while ensuring data used by the application is secure from the remainder of the network.

The described structure of the data security server 202 and the security service more generally may enable much faster installing of the system into new and/or untrusted networks and subsequent updating. This structure may also enable replacement servers, such in the case of a failure, to be instantiated very quickly. Each container engine may be defined by an image, such that upon a failure event, the last saved version of the image may be loaded onto a new container engine, and a replacement server instantiated. Also it should be appreciated that the OS 204, container engine 206 and various containers or applications 208, 210, 212, 214 may be run on variety of hardware, which is non-specialized or commodity, thus allowing provisioning of new servers into various networks including a variety of different computing devices. These attributes of the described system also ensure scalable deployment, by reducing barriers to installing new servers into various locations and reducing the time necessary to do so.

Figure 3:
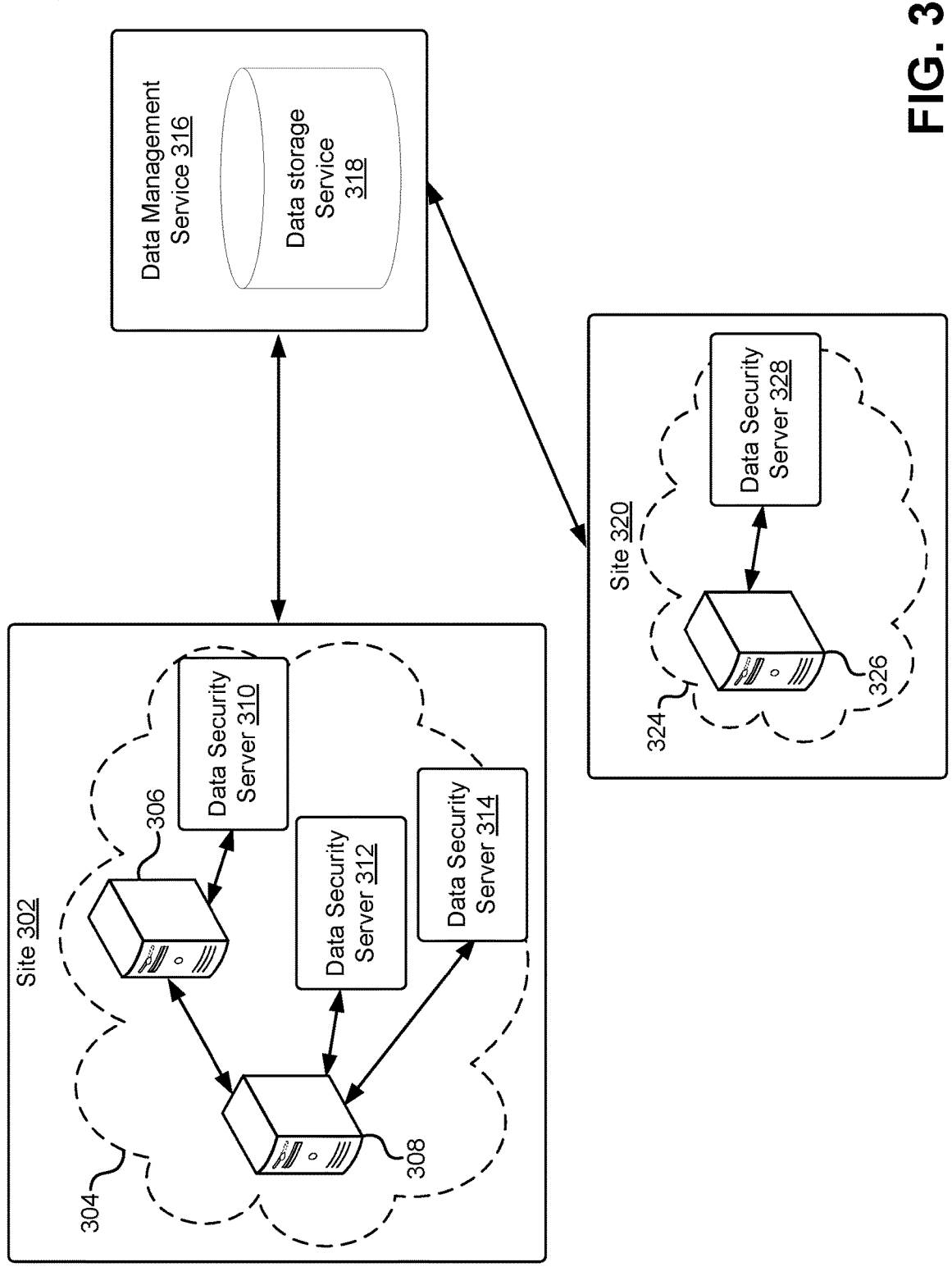
FIG. 3 shows an illustrative example of computing resource service provider in communication with multiple data security servers associated with multiple sites, in which various embodiments may be practiced.

FIG. 3 shows an illustrative example 300 of multiple data security servers 310, 312, 314, and 328, associated with different sites 302, 320, in communication with a data management service 316. As illustrated, different sites 302, 320 may be created, and different data security servers 310, 312, 314, and 328 associated with each site. In this way, different data security functions may be configured for specific networks and specific network locations, resources, etc., with different data security servers positioned at different locations within, and/or connected to different resources in different network.

As illustrated, site 302 may be a logical organization of one or more data security servers 310, 312, 314 associated with a network 304. In some aspects, the site 302 may be associated with one or more of computing devices 306, 308 of network 304. In some cases, site 302 may be associated with an identifier in a record stored in data security servers 310, 312, 314, the data management service 316, and/or the data storage service 318, or another computing device or storage location, or a combination thereof. In some aspects, site 302 may include a number of devices 306 and 308 across a network 304, determined by locations, such as a building, campus, etc. In other cases, the site 302 may include computing devices 306 and 308 performing certain operations or functionality, such as security, data storage, and so on.

In some examples, each data security server 310, 312, 314 may perform specific security functions with respect to certain computing devices 306, 308 of network 304. For example, different of data security servers 310, 312, 314 may monitor specific types of traffic, look for certain types of threats or attacks, or be associated with specific subsystems of network 304 or computing device 308. In other examples, a data security server may be redundant, in the case of a system critical computing device or function, such as in the case of data security servers 312 and 314 both being connected to computing device 308.

In some aspects, a single account may be associated with multiple sites, such as sites 302 and 320. The different sites may be collocated or physically separated, such as in different buildings, or at different campuses. In this way, sites and data security servers may be configured to provide a vast array of different data security and monitoring functions throughout one or multiple networks.

Figure 4:
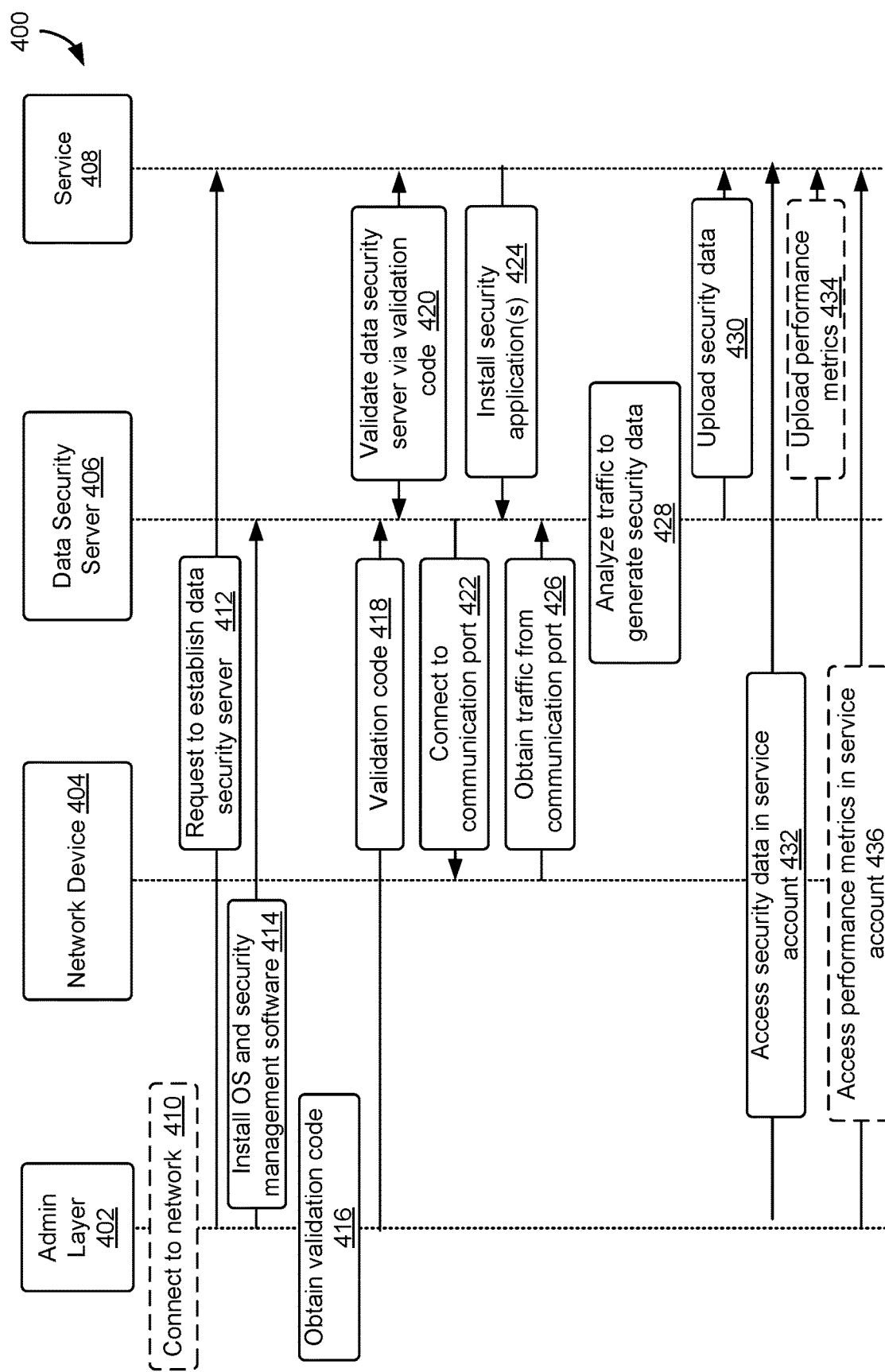
FIG. 4 shows an illustrative example of communications between various elements of a site and a service, which may be part of the systems of FIGS. 1, 2, and/or 3.

FIG. 4 shows an illustrative example of communications 400 between various elements of a computing resource service provider and a network, which may be part of the systems of FIGS. 1, 2 and/or 3, to establish a data security server in a network and receive security data from the data security server. An admin layer 402 may include a software layer of a service 408, accessible by an entity seeking to establish a data security server into a network. In some examples, the admin layer 402 may be accessed by any computing device connected to the service 408 via a network. The network device 404 may be any computing device within a network to be monitored. In one example, the network device 404 may include an internet gateway of the network that manages in and outward flows of traffic into and out of the network. The data security server 406 may include aspects of the data security servers 112, 202, 310, 312, 314, and 328 described above. Service 408 may be a computing device or distributed computing resource provider, and may include one or more aspects of computing resource service provider 118, data management service 122, 218, 316, and/or data storage service 120, 216, or 318 described above.

Dotted lines in FIG. 4 may indicate optional, but not required operations, such that they are not necessary for the establishment of data security server 406 in a network or to receive security data therefrom.

In the illustrated example, the admin layer 402 may first connect to a network to be analyzed at operation 410. This may include logging into a secured network, connecting to an access point of the network and gaining access privileges, etc. The admin layer 402 may then request to establish a data security server 412 in the network, by sending a request to the service 408. In some cases, the admin layer 402 may install an OS and a security management software into a device in the network to establish a data security server 406. In some cases, the admin layer 402 may obtain the OS and security management software via a link or URI sent by the service 408, or from the service 408 itself, or by looking up requirements for establishing the data security server 406 and locating the appropriate software. In any event, the admin layer 402 may direct or instruct a computing device, such as one already part of the network, or a dedicated computing device to install an appropriate OS and the security management software, at operation 414, to instantiate the data security server 406. In some aspects, the OS may be a version of Linux, such that supports a software container engine, such as Docker, which may be part of the security management software. In some aspects, operation 414 may include loading the OS and software onto a dedicated device that is to be connected to the network. In yet some cases, a computing device may come with the OS and security management software pre-installed, such that the data security server 406 is a pre-configured device ready for installation/connection to a network.

In some aspects, the service 408, upon receiving the request to establish a data security server at operation 412, may generate a validation or security code, and send the code to the admin layer 402, for example, via a commutation channel such as email, text message, etc. The admin layer 402 may obtain the security code, at operation 416, either directly or indirectly from the service 408, and send or enter the validation code into the data security server 406, at operation 418.

The data security server 406 may communicate the code to the service 408, which may validation the code and activate the data security server 406, at operation 420. The data security server 406 may then connect or be connected to a communication port, such as a switched port analyzer or SPAN port, Ethernet port, or optical port, of a network device 404, at operation 422. The service 408 may send commands to the data security server 406 to install one or more security applications, such as the threat detection and network analysis applications 208 and 210 described above in reference to FIG. 2, at operation 424. In some cases, operation 424 may also include instructions to install a control agent, such as control agent 212, and an uploader, such as uploader 214, also described above in reference to FIG. 2. In some aspects, the service 424 may include the instruction set or code for the applications, or may point to locations where the software can be found. In yet some cases, the service 408 may additionally or alternatively send the set of commands to the admin layer 402, which may then facilitate installing the designated applications onto data security server 406.

Once the security applications have been installed, such as in containers onto the data security server 406, the data security server 406 may begin obtaining copies of traffic in the form of packets from the network device 404. The various security applications may then analyze the copied or mirrored traffic data and generate security data in the form of alerts, logs, results, comparisons, etc., at operation 428. The data security server 406 may then upload the security data to the service 408, at operation 430, which may facilitate storing the data, for example, in a data storage service, and/or making some or all of the data available through one or more interfaces, such that the admin layer 402 or other device may access the security data from the service 408, at operation 432. In some aspects, operation 430 may include sending or uploading the security data directly to a customer/data storage service account, without being routed through other sections of the service or through other devices, etc. In this way, security of the security data may be increased, by minimizing exposure to other devices or computing environments.

In some cases, the one or more security applications installed onto the server 406 may also include a performance metrics application or metrics agent, which tracks various performance characteristics of the data security server 406. In some cases, this performance data may be uploaded to the service at operation 434, whereby an admin layer 402 or other device may access the data, at operation 436, via the service 408, to enable better management of the server 406 and provide information to facilitate performance improvements to the server 406. In some cases the performance metrics application may provide health information of the data security server 406, for example, to enable better control and updating of data security servers, taking unhealthy data security servers offline, etc.

Figure 5:
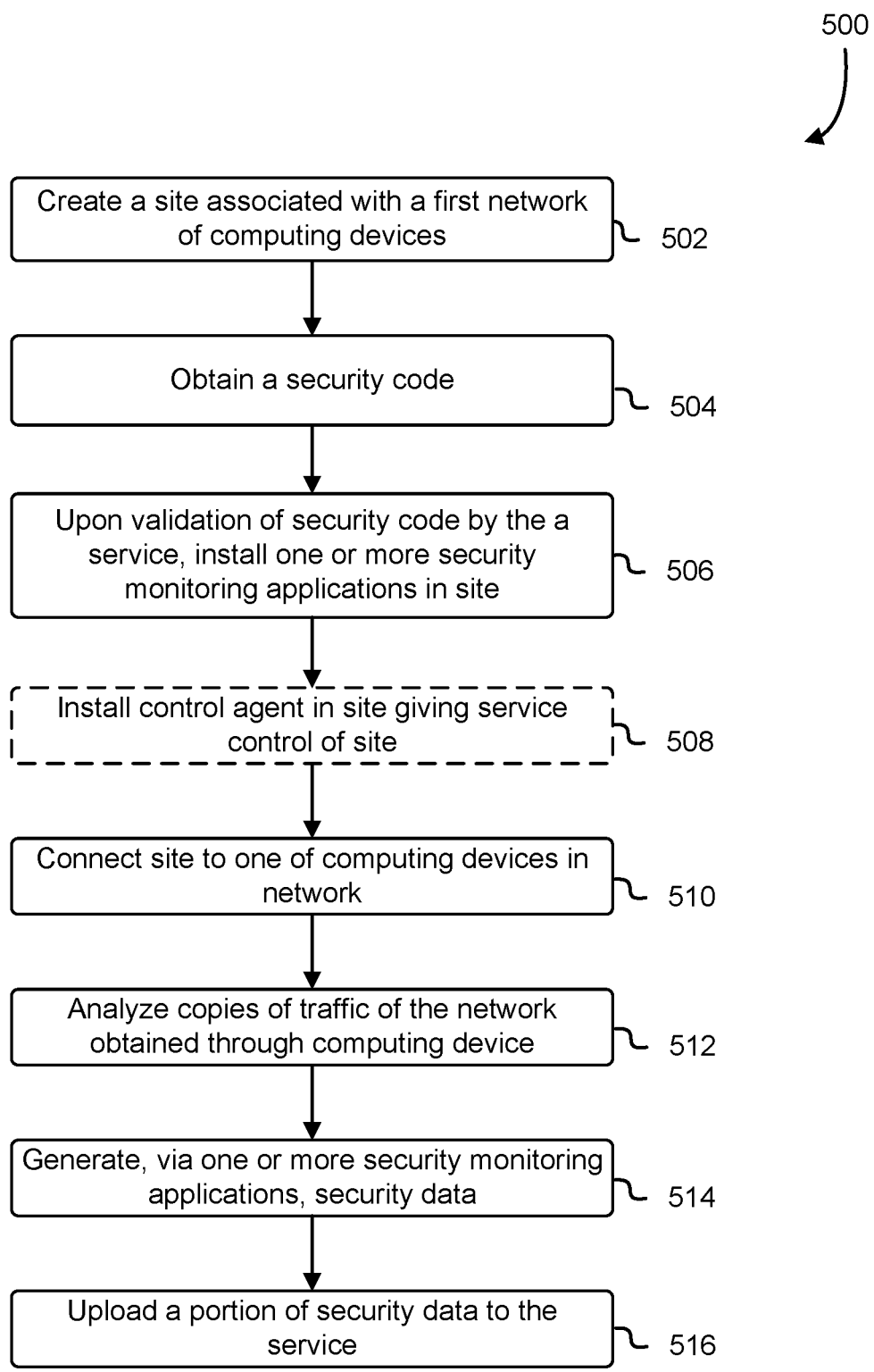
FIG. 5 shows an illustrative example process for instantiating a site and uploading security data to a service, which may be performed by the site or data security server of FIGS. 1, 2, and/or 3.

FIG. 5 shows an illustrative example process 500 for instantiating a data security server or site and uploading data to a data management service, which may be performed by the computing data security server 112, 202, 310, 312, 314, 328, or 406 of FIGS. 1, 2, and 3. Dotted lines in FIG. 5 may indicate optional, but not required operations, such that process 500 may be performed without the optional steps.

Process 500 may begin at operation 502, where a site may be created and associated with a first network of computing devices. In some aspects, operation 5202 may include running a template in an account with a serve, such as the data management service described above. In some cases the site may be created by associating a site identifier with identifying information of a network and/or various devices of the network. In some aspects, a computing device or virtual machine may perform operation 502, such as by receiving a site identifier from an admin layer.

Next, at operation 504, the site may obtain a security code. In some aspects, the security code may be generated by a service, such as a data management service, and may be sent to or accessed by an admin layer, for provisioning of a new site. In some aspects, the admin layer may access the security code via an identity and data access management system or service, provided by, or interfacing with, the service. The security code (e.g., in the form of a JSON output) may be provided to the admin layer by the service after a template is installed and running on a network computing device to instantiate the data security server. The admin layer may send or input the security code into the site, thus establishing a connection between a data storage account and the data management service. In other cases, the site may be initially provisioned with a security code, and upon activation, for example, by an admin layer or other device, may retrieve the security code. Upon validation of the security code by the service, the site may install one or more security monitoring applications, at operation 506. In some aspects, operation 506 may include installing a threat detection application, network analysis applications and a data uploader application. In some cases, the service may provide the code or software to install the applications or simply a set of commands to locate and install the applications. In some aspects, the site may also install a control agent giving the service control of the site, at operation 508.

Next, at operation 510, the site may connect to a computing device of the network, for example via an Ethernet, SPAN or optical port of a network device, such as an internet gateway device of the network. The security monitoring applications may obtain and analyze copies of traffic of the network, through the SPAN or optical port, and generate security data, as described above in reference to FIG. 2, at operations 512 and 514. The site may upload at least a portion of the security data to the service, at operation 516, for example, via the data uploader.

In some aspects, the site may collect operational data of the site, and generate performance metrics based on that data, such as efficiency metrics, health metrics, resource utilization metrics, percentage of security threats detected, and so on. In some aspects, the site may upload the performance metrics to the service for storage and access, for example, by an admin layer or other device associated with the account. In some cases, the performance metrics may be used, either manually, or automatically, to update and/or optimize certain operations of the site. In some aspects, collecting and generation of the performance metrics may be implemented by a Cloudwatch agent.

In some aspects, the site may install each or a subset of the security monitoring applications in separate software containers, for example, to increase the security around the data collected and generated by each application. In some aspects, the site may include a computing resource connected to a communication port of the network and loaded with security management software running a software container engine, such as Docker. In some aspects, the site may obtain and execute commands to install one or more third party applications in the site, such as one or more additional security or monitoring applications or another type of application.

Figure 6:
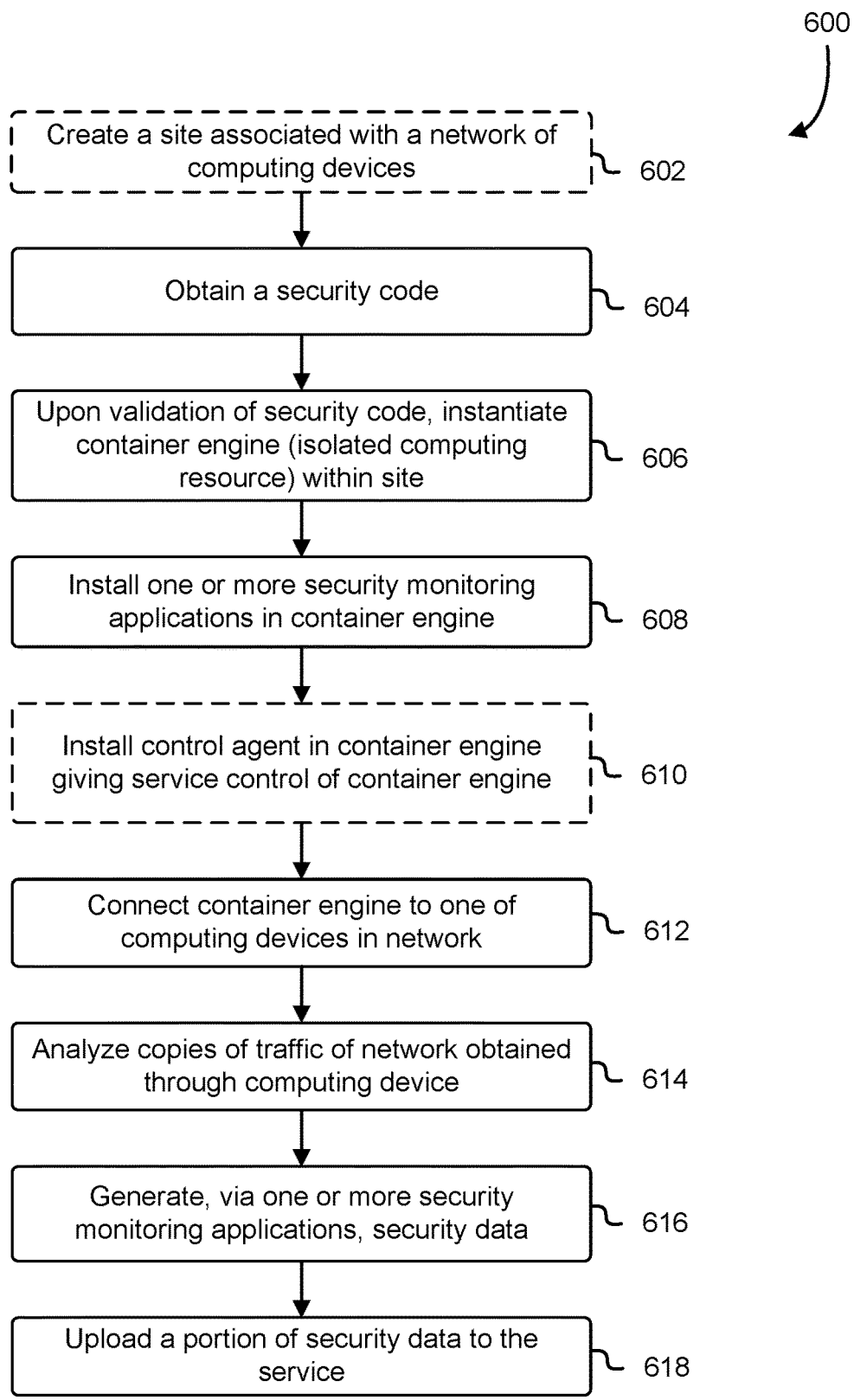
FIG. 6 shows an illustrative example process for instantiating multiple isolated computing resources into a site and uploading data to a service, which may be performed by the site or data security server of FIGS. 1, 2, and/or 3.

FIG. 6 shows an illustrative example process 600 for instantiating multiple isolated computing resources or container engines on a data security server and uploading data to a data management service, which may be performed by the computing data security server 112, 202, 310, 312, 314, 328, or 406 of FIGS. 1, 2, and 3. Dotted lines in FIG. 6 may indicate optional, but not required operations, such that process 600 may be performed without the optional steps.

Process 600 may include a number of operations in common to process 500, and for the sake of brevity, those similar operations will not be described again here. Process 600 may differ from process 500 in that individual container engines may be individually configured and associated with a site. After a site is created, or established at operation 602, a security code may be obtained, at operation 604, and upon validation of the security code by the service, a software container engine or isolated computing resource may be instantiated within the site, at operation 606. One or more security monitoring applications may be installed in the container engine, such as each in its own container, and, in some aspects, a control agent may also be installed in the container engine, at operations 608 and 610.

Next, at operation 612, the container engine may be connected to one of the computing devices in the network to be monitored. The one or more security applications operating within the container engine may analyze traffic data obtained from the network computing device and may generate security data relating to the obtained traffic data, at operations 614 and 616. Next, the container engine, via a data uploader, may upload at least a portion of the security data to the service, for storage and retrieval, at operation 618.

Operations 604-618 may be repeated any number of times to instantiate multiple container engines into a site. In some aspects, a default set of applications may be installed into each container engine, such as the applications 208, 210, 212, and/or 214 described above in reference to FIG. 2. In some cases, other applications may be added to one or more of the container engines to provide for specific functionality at different locations (logical or physical) or computing resources of a network, to monitor different types of traffic and the like.

Figure 7:
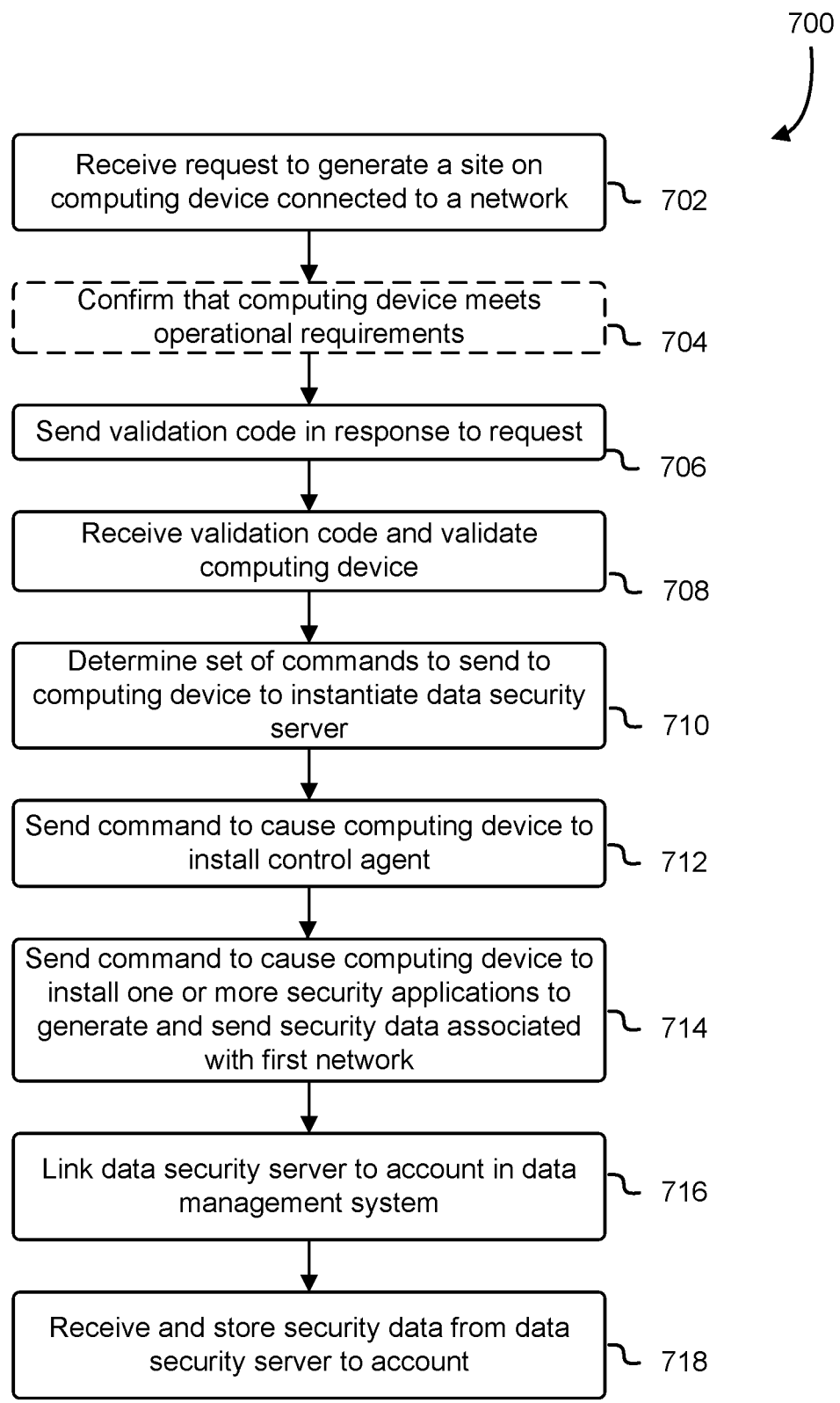
FIG. 7 shows an illustrative example process for provisioning a data security server and receiving security data by a service, which may be performed by one or more services or providers of FIGS. 1, 2, and/or 3.

FIG. 7 shows an illustrative example process 500 for provisioning a data security server and receiving security data by a service, which may be performed by the computing resource service provider 118, data management service 122, 218, 316, and/or data storage service 120, 216, or 318, and/or service 408 described above in reference to FIGS. 1, 2, 3, and 4. Dotted lines in FIG. 7 may indicate optional, but not required operations, such that process 700 may be performed without the optional steps.

Process 700 may begin at operation 702, where a service may receive a request to generate site on a computing device connected to a network, such as an untrusted network to the service. In some aspects, the service may confirm that the computing device meets certain operational or security requirements, at operation 704. These operational requirements may include having a supported operating system installed (e.g., Linux), and/or data security management software, such as a supported software container engine. In some aspects, the operational requirements may be physical resource requirements to support a certain or certain type of operating system and a container engine or other data security management software.

Next, at operation 706, the service may send a validation code, such as an alpha numeric code, in response to the request. In some cases, this may be sent to an admin layer, or account associated with an authorized device. Next, the service may receive the validation code back, for example, from a computing device on which a site may be generated/a data security server instantiated, and validate the code at operation 708. The code may be received through any of a number of communication channels. At operation 710, the service may determine a set of commands or instructions to send to the computing device to instantiate a data security server, for example, based on the security code. The service may then, at operation 712, send one or more commands to cause the computing device to install a control agent, to enable the service to control operations of the computing resource. These operations may include installing new applications, updating certain applications, or placing limits on what data each application can access, and a variety of other operations. Additionally, at operation 714, the service may send one or a set of commands to cause the computing device to install one or more security applications to obtain traffic data from the network, and generate and send security data associated with the network, back to the service.

The service may then, at operation 716, link the data security server to an account in the service or a different service, including a standalone data management service and/or data storage service. The service and/or standalone service may then receive and store the security data from the data security server to an account associated with the data security server, at operation 718. In some aspects, the security data may be sent directly from the data security server to an account of a data storage service, such as S3, without passing through other aspects of the data management service, to better ensure that the security data is not seen or tampered with by an unwanted device or party.

In some aspects, the service may send another set of commands to cause the computing device to install one or more other third party applications, to perform any of a number of various functions.

In some aspects, once a security code is received back by the service, at operation 708, one or more of operations 710-718 may be performed automatically, such that no additional user input is required to complete these operations.

Figure 8:
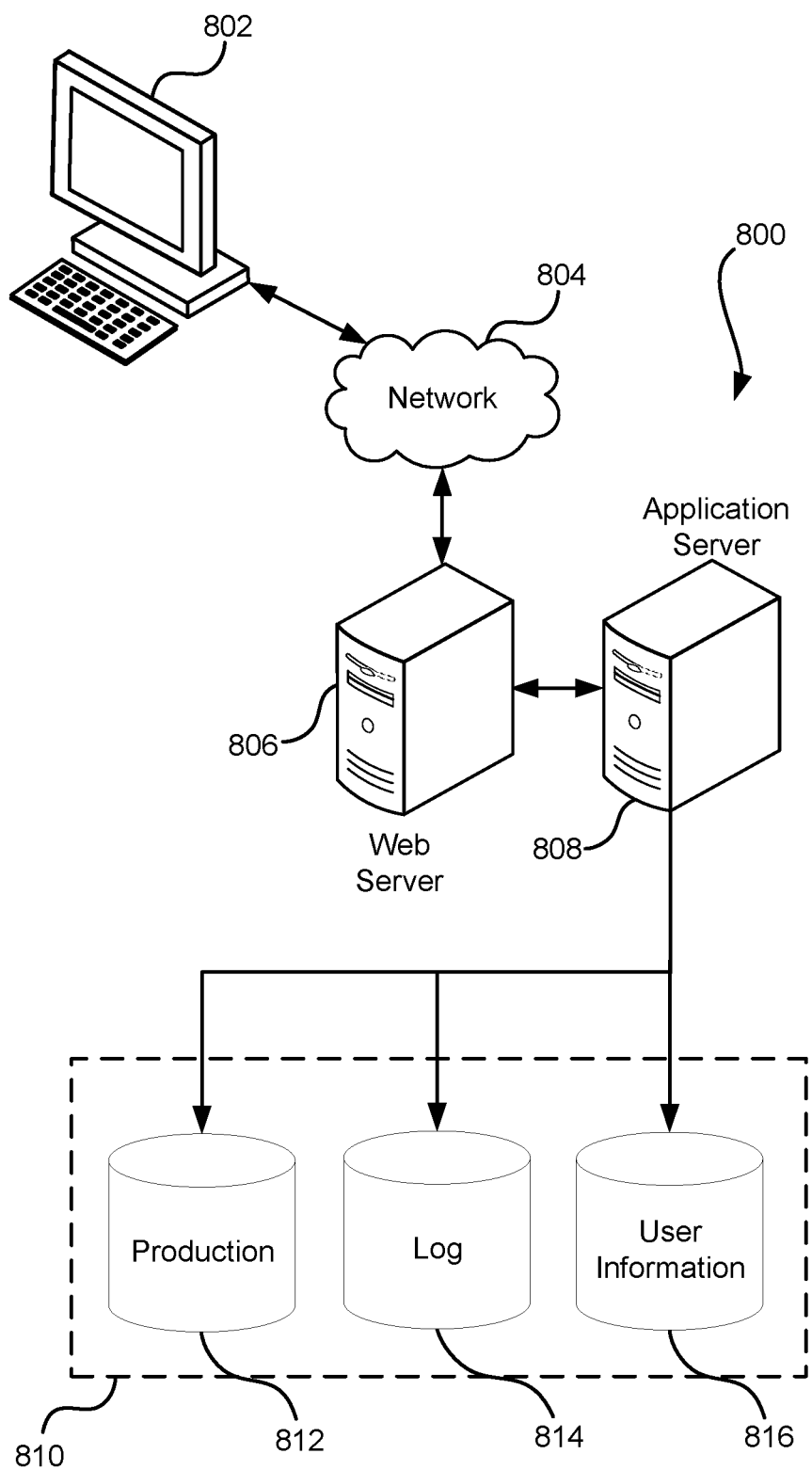
FIG. 8 illustrates a system in which various embodiments can be implemented.

FIG. 8 illustrates aspects of an example system 800 for implementing aspects in accordance with an embodiment. As will be appreciated, although a web-based system is used for purposes of explanation, different systems may be used, as appropriate, to implement various embodiments. In an embodiment, the system includes an electronic client device 802, which may be an example of the data security server 112, 202, 310, 312, 314, 328, or 406, which includes any appropriate device operable to send and/or receive requests, messages, or information over an appropriate network 804 and convey information back to a user of the device. Examples of such client devices include embedded computer systems, servers, and other computing systems and devices. In an embodiment, the network includes any appropriate network, including an intranet, the Internet, a cellular network, a local area network, a satellite network or any other such network and/or combination thereof and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly-addressable communications network, as the system includes a web server 806 for receiving requests and serving content in response thereto, although for other networks an alternative device serving a similar purpose could be used as would be apparent to one of ordinary skill in the art.

In an embodiment, the illustrative system includes at least one application server 808 and a data store 810 and it should be understood that there can be several application servers, layers or other elements, processes or components, which may be chained or otherwise configured, which can interact to perform tasks such as obtaining data from an appropriate data store. The application server 808, or the system 800 as a whole, may provide one or more aspects of the service, such as computing resource service provider 118, data management service 122, 218, 316, and/or service 408 described above. The data store may similarly provide one or more aspects of the data storage service 120, 216, or 318 also described above. Servers, in an embodiment, are implemented as hardware devices, virtual computer systems, programming modules being executed on a computer system, and/or other devices configured with hardware and/or software to receive and respond to communications (e.g., web service application programming interface (API) requests) over a network. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered system. Data stores, in an embodiment, communicate with block-level and/or object level interfaces. The application server can include any appropriate hardware, software and firmware for integrating with the data store as needed to execute aspects of one or more applications for the client device, handling some or all of the data access and business logic for an application.

In an embodiment, the application server provides access control services in cooperation with the data store and generates content including, but not limited to, text, graphics, audio, video and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation (JSON), and/or another appropriate client-side or other structured language. Content transferred to a client device, in an embodiment, is processed by the client device to provide the content in one or more forms including, but not limited to, forms that are perceptible to the user audibly, visually and/or through other senses. The handling of all requests and responses, as well as the delivery of content between the client device 802 and the application server 808, in an embodiment, is handled by the web server using PHP: Hypertext Preprocessor ("PHP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

The data store 810, in an embodiment, includes several separate data tables, databases, data documents, dynamic data storage schemes and/or other data storage mechanisms and media for storing data relating to a particular aspect of the present disclosure. In an embodiment, the data store illustrated includes mechanisms for storing production data 812 and user information 816, which are used to serve content for the production side. The data store also is shown to include a mechanism for storing log data 814, which is used, in an embodiment, for reporting, computing resource management, analysis or other such purposes. In an embodiment, other aspects such as page image information and access rights information (e.g., access control policies or other encodings of permissions) are stored in the data store in any of the above listed mechanisms as appropriate or in additional mechanisms in the data store 810.

The data store 810, in an embodiment, is operable, through logic associated therewith, to receive instructions from the application server 808 and obtain, update or otherwise process data in response thereto and the application server 808 provides static, dynamic, or a combination of static and dynamic data in response to the received instructions. In an embodiment, dynamic data, such as data used in web logs (blogs), shopping applications, news services, and other such applications are generated by server-side structured languages as described herein or are provided by a content management system ("CMS") operating on, or under the control of, the application server. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the user device 802. Continuing with example, information for a particular item of interest is viewed in a dedicated page or window of the browser. It should be noted, however, that embodiments of the present disclosure are not necessarily limited to the context of web pages, but are more generally applicable to processing requests in general, where the requests are not necessarily requests for content. Example requests include requests to manage and/or interact with computing resources hosted by the system 800 and/or another system, such as for launching, terminating, deleting, modifying, reading, and/or otherwise accessing such computing resources.

In an embodiment, each server typically includes an operating system that provides executable program instructions for the general administration and operation of that server and includes a computer-readable storage medium (e.g., a hard disk, random access memory, read only memory, etc.) storing instructions that, if executed (i.e., as a result of being executed) by a processor of the server, cause or otherwise allow the server to perform its intended functions.

The system 800, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 8. Thus, the depiction of the system 800 in FIG. 8 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols and such a system also includes a number of workstations running any of a variety of commercially-available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, and software containers utilizing operating-system level virtualization and other virtual devices or non-virtual devices supporting virtualization capable of communicating via a network.

In an embodiment, a system utilizes at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that run one or more of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C# or C++, or any scripting language, such as Ruby, PHP, Perl, Python or TCL, as well as combinations thereof. In an embodiment, the one or more servers also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above which can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood with the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two, but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, a non-transitory computer-readable storage medium store instructions and a main CPU execute some of the instructions while a graphics processor unit executes other instructions. In an embodiment, different components of a computer system have separate processors and different processors execute different subsets of the instructions.

Accordingly, in an embodiment, computer systems are configured to implement one or more services that singly or collectively perform operations of processes described herein and such computer systems are configured with applicable hardware and/or software that enable the performance of the operations. Further, a computer system that implement an embodiment of the present disclosure is a single device and, in another embodiment, is a distributed computer systems comprising multiple devices that operate differently such that the distributed computer system performs the operations described herein and such that a single device does not perform all operations.

The use of any and all examples, or exemplary language (e.g., "such as") provided herein, is intended merely to better illuminate embodiments of the disclosure and does not pose a limitation on the scope unless otherwise claimed. No language in the specification should be construed as indicating any non-claimed element as essential to the practice of the disclosure.

Embodiments of this disclosure are described herein, including the best mode known to the inventors for carrying out the described systems and methods. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:
1. A system, comprising:
   one or more processors; and
   memory with instructions that, as a result of being executed by the one or more processors, cause the system to at least:
      create a site corresponding to a number of computing devices of a network, the site comprising at least one software container engine isolated from the number of computing devices and executing a virtualized data security server;
      obtain a security code, generated by a service, corresponding to the site;
      transmit the code to the service to obtain instructions to cause the system to receive instructions to:
         install a control agent into the virtualized data security server, wherein the control agent enables the service to control operations performed within the virtualized data security server;
         install one or more security monitoring applications in the at least one software container engine to monitor and analyze traffic of the network and generate, via the one or more security monitoring applications, security data;
         load credentials to access a data storage service; and use the credentials to upload the security data to an account of the data storage service associated with the site; and execute the instructions.

2. The system of claim 1, wherein the memory further includes instructions, that, as a result of being executed by the one or more processors, further cause the system to:

create a second software container engine associated with the site; and load a second subset of the one or more security monitoring applications onto the second software container engine, wherein the one or more security monitoring applications of the software container engine are isolated from the one or more security monitoring applications of the second software container engine.

3. The system of claim 2, wherein the software container engine is connected to a first computing device of the number of computing devices of the first network and generates and uploads first security data to the account of the data storage service, wherein the second software container engine is connected to a second computing device of the number of computing devices of the first network and generates and uploads second security data to the account of the data storage service.

4. The system of claim 1, wherein the one or more security monitoring applications further comprise a metrics agent, wherein the metrics agent:

obtains operational data of the site; and generates performance metrics of the site based on the received operational data.

5. A method comprising:

obtaining a code corresponding to a site, wherein the site is associated with a network corresponding to a number of computing devices, and wherein the site comprising at least one software container that executes processes isolated from, and to monitor, the number of computing devices; and transmit the code to a service to obtain instructions to cause the site to receive instructions to:

in response to validation of the code, obtaining and executing commands from the service to install one or more security monitoring applications in the at least one software container;

connecting the at least one software container to one of the number of computing devices of the network to obtain copies of traffic of the network;

analyzing the copies of traffic of the network and generating, via the one or more security monitoring applications, security data; and uploading at least a portion of the security data to the service.

6. The method of claim 5, further comprising:

installing a control agent into the at least one software container, wherein the control agent enables the service to at least one of perform version control on the one or more security monitoring applications or control operations performed by the one or more security monitoring applications associated with the site.

7. The method of claim 5, wherein individual applications of one or more security monitoring applications are isolated from other applications of the one or more security monitoring applications in software containers.

8. The method of claim 5, further comprising creating at least two software container engines associated with the site, wherein individual of the at least two software container engines are loaded with separate of the one or more security monitoring applications and generate different sets of security data.

9. The method of claim 5, wherein the site comprises a computing resource connected to a communication port of the network and loaded with security management software running a software container engine.

10. The method of claim 5, further comprising:

generating performance metrics of the site based on received operational data of the one or more security monitoring applications.

11. The method of claim 5, further comprising:

obtaining and executing commands to install one or more third party applications in the site.

12. The method of claim 5, wherein the one or more security monitoring applications further comprise a threat detection application and a network analysis application.

13. A method comprising:

receiving, by a service, a security code from a data security server associated with a network;

determining a set of commands to send to the data security server based on validation of the security code;

sending the set of commands to the data security server to cause the data security server to:

install one or more security applications;

obtain copies of traffic of the network;

analyze the copies of traffic using the one or more security applications to generate security data;

sending a second set of commands to the data security server to cause the data security server to install a control agent, wherein the control agent enables the service to control operations of the data security server; and transmit the security data to the service; and in response to receiving the security data, store the security data in an account associated with service.

14. The method of claim 13, wherein the data security server is executed within a software container.

15. The method of claim 14, further comprising sending at least one update to the one or more security applications of the data security server through the control agent.

16. The method of claim 14, further comprising sending a thirds set of commands to the data security server to cause the data security server to install a third party application through the control agent.

17. The method of claim 13, further comprising:

determining that a computing resource meets security requirements for installing the one or more security applications, wherein the security requirements comprise running a specified container engine; and generating the security code upon determining that the computing resource meets the security requirements.

18. The method of claim 13, wherein the one or more security applications are installed in different software containers of the data security server.

19. The method of claim 13, wherein the data security server comprises a computing resource loaded with an operating system that supports a software container engine.

20. The method of claim 19, wherein the network comprises an untrusted network to the service.

* * * * *